3,264,369
RESINOUS COMPOSITION OF EPOXIDIZED p,p'-DIHYDROXY, DIPHENYLDIMETHYLMETHANE, A PHENOL-FORMALDEHYDE NOVOLAC AND AN ALKANOL-AMINE CATALYST
Salim N. Ephraim, Forest Hills, N.Y., assignor to Reichhold Chemicals, Inc., White Plains, N.Y.
No Drawing. Original application Nov. 23, 1959, Ser. No. 854,589. Divided and this application Dec. 8, 1964, Ser. No. 422,881
4 Claims. (Cl. 260—831)

The present application is a division of my application Serial No. 854,589, filed November 23, 1959, now abandoned.

This invention relates to improved resin compositions and to the method of making the same, and to blends of phenolic resins, epoxy resins and catalysts, wherein said resin blends have excellent shelf life at room temperatures and fast cure at elevated temperatures.

Blends of phenolic resins and epoxy resins have been cured heretofore with various catalysts; however, this curing materially restricted the usefulness of the blend. For example, if the catalyst produced a rapid cure at elevated temperatures, it likewise produced a poor shelf life at room temperatures. In such instances, a two component system of the catalyst and the resin blend, with its attendant disadvantages, was required. In contradistinction, when less reactive catalysts were used to cure blends of phenolic resins and epoxy resins that produced systems relatively stable at room temperatures, such blends cured so slowly at elevated temperatures that it was substantially impossible to utilize such systems from both economic and utilitarian standpoints.

Catalysts of the foregoing types have included specific amine compounds. Compositions comprising blends of the phenolic and epoxy resins cured with certain amine catalysts produce products adaptable for a wide variety of uses. For example, such blend systems can be dissolved in organic solvents and the solutions thereof find utility as thermohardenable varnishes to coat various articles, impregnate glass fabrics, etc.

An object of this invention is to provide improved resin compositions that combine good shelf life at room temperatures and fast cure at elevated temperatures.

Another object is to provide an improved method that comprises heat reacting blends of phenolic resins, epoxy resins, and a certain type of amine catalyst, as described hereinbelow.

These and other objects of the invention will be apparent from the following specification and appended claims.

It has been discovered that these and other objects of the invention are attained by adding hydroxyalkylated tertiary amines as catalysts to blends comprising phenolic resins and epoxy resins to obtain resin blends having long shelf life and fast curing rates at elevated temperatures. These hydroxylated tertiary amines may be obtained by reacting alkene oxides, such as ethylene oxide, propylene oxide, butylene oxide, etc., with ammonia, or mono or polyamines. This group of compounds includes, among others, triethanol amine, N,N,N',N'-tetrakis(hydroxypropyl) ethylenediamine or ethoxylated fatty acid amines represented by the formula

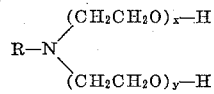

wherein R is a straight chain alkyl group having between 12 and 18 carbon atoms, and wherein the sum of x and y is between about 2 and about 15. Compounds of the latter type are commercially available, for example, from the Armour Chemical Division, Chicago, under the trade name "Ethomeens." Examples include Ethomeen C/12, wherein x and y equal 2, coconut oil being the source of the C–12 alkyl group, Ethomeen S/25, wherein x and y equal 15, soybean oil being the source of the C–18 alkyl group, etc.

The amount of tertiary amine compound which may be added to the blend of phenolic resin and epoxy resin ranges from about 0.5% up to about 5%, based on the combined weight of the phenolic and epoxy resins. For most practical purposes, however, it is preferred to use between about 1.5% and about 3.0%.

The resin blend to be catalyzed with the tertiary amine catalyst consists of conventional materials described in the prior art.

The phenolic resins, which are operative in the present invention, are of the novolac-type, which means that they are made by acidic condensation of mono- or dihydric phenols with formaldehyde. After the reaction is substantially complete, as indicated by the consumption of the free formaldehyde, the reaction product is stripped in vacuum to remove water and the unreacted phenol. However, in practice, it has been found difficult to remove all of the unreacted phenol and, therefore, generally up to 10 weight percent (based upon phenolic resin) unreacted phenol may remain in the resin. The resulting novolac is a fusible resin having practically no methylol groups, but only phenolic hydroxyl groups as the only reactive sites for further reactions. The novolac may contain up to 10 percent by weight of unreacted phenol.

Among the mono- and dihydric phenols, which may be used in producing the phenolic resins, are mononuclear monohydric phenols having at least one hydrogen formaldehyde reactive atom attached to the benzene ring thereof.

Formaldehyde-reactive hydrogen atoms of the phenols are the ortho or para positioned hydrogen atoms of the benzene ring of the phenols and, thus, do not include the meta positioned hydrogen atoms of this ring. Examples include phenol, ortho-cresol, meta-cresol, para-cresol, 2,3-xylenol, 2,4-xylenol, 2,5-xylenol, 2,6-xylenol, 3,4-xylenol, 3,5-xylenol, para tertiary butyl phenol, amyl phenol, etc. Operative dihydric phenols include both mononuclear and polynuclear phenols, such as resorcinol, catechol, hydroquinone, and 4,4'-dihydroxydiphenyldimethylmethane.

The formaldehyde is used either as an aqueous solution, as gas, or as paraformaldehyde. The mol ratio of formaldehyde to phenol depends on the desired properties of the resulting novolac. Generally, a ratio between about 0.5 and 0.85 to 1.00 is used. A ratio lower than 0.5 leads to resins of too low molecular weight and the excess of unreacted phenol which has to be stripped makes the process uneconomical. A ratio of greater than the 0.85 usually yields insoluble and infusible masses.

The epoxy resins used in the present invention are polyglycidyl ethers of polyhydric phenols and are made by esterification of 4,4'-dihydroxydiphenyldimethylmethane (Bisphenol A), with an epihalohydrin in alkaline medium. Depending upon the mol ratio of epihalohydrin to the phenolic hydroxyl, said ratio being variable between about 1.0 and 10.0, resins of various molecular weights can be obtained. More specifically, it is customary to identify the resins by their epoxy equivalent weight; the resins can be made with an epoxy equivalent weight of about 170 up to about 2000. The epoxide equivalent weight is generally determined by the pyridine hydrochloride method reported by a number of patents.

The weight ratio of phenolic resins to epoxy resins may vary from about 1 to 10 to 10 to 1. Ratios ranging from about 1 to 5 to 5 to 1 were found to be particularly advantageous. The following examples are presented to better illustrate and describe the invention and only such limitations as are imposed by the appended claims are hereby intended.

PREPARATION OF RESINS

Although the preparation of the resins used as starting materials is not an object of the present invention, a few conventional resin preparations are described below in order to better identify the resins. The phenolic resins, which may be used in the present invention, are well-known materials. The following example provides a detailed description of the preparation of a representative example.

Phenolic resin

To a 250 ml. three-necked round bottom flask fitted with thermometer, agitator and reflux condenser were charged 94 grams (1.0 mol) of phenol, 0.5 grams of 30% sulfuric acid, and 67 grams of an aqueous 37% formaldehyde solution (0.82 mol). The mixture was slowly heated to about 50–65° C. As soon as the exothermic reaction started, the heat was shut off. When the exotherm abated, the reaction mixture was heated under reflux for three to four hours. Then the aqueous phase was separated and discarded, and the resinous reaction produced was neutralized with a solution of potassium hydroxide in ethanol. The reaction product was slowly heated in a still under 15 mm. Hg vacuum up to 180° C. and kept at 180° C. for about one hour until no more volatile materials were distilling off. The novolac thus produced was poured into a can, allowed to cool to room temperature, and broken up into lumps.

Acidic catalysts, other than sulfuric acid, may also be used, such as hydrochloric acid, oxalic acid, phosphoric acid, and the like. The product is designated hereinafter as Resin I.

Epoxy resin

The epoxy resins, which may be used in the present invention, include polyglycidyl ethers of polyhydric alcohols. The examples given below described the preparation of these polyethers of different epoxy equivalent weights.

Bis-phenol A was dissolved in epichlorohydrin in the proportion of 5,130 parts (22.5 mols) of bis-phenol in 2,812 parts (225 mols) of epichlorohydrin and 104 parts of water. The solution was prepared in a vessel provided with heating and cooling equipment, agitator, distillation condenser, and receiver. A total of 1880 parts of solid 97.5% sodium hydroxide, corresponding to 2.04 mols of sodium hydroxide per mol of bis-phenol (2% excess) was added in increments. The first increment of 300 parts of sodium hydroxide was added and the mixture heated with sufficient agitation. The heating was discontinued as the temperature reached 80° C. and cooling was started in order to remove the exothermic heat of reaction. The temperature control, i.e., cooling, prevented the temperature from rising to more than 100° C. When the exothermic reaction had ceased, and the temperature had fallen to about 97° C., a further addition of 316 parts of sodium hydroxide was made and similar further additions were effected at successive intervals. An exothermic reaction took place after each caustic addition. Sufficient cooling was employed to cause a gentle distillation of epichlorohydrin and water, but the temperature was not allowed to go below about 95° C. No cooling was necessary after the final addition of sodium hydroxide. After the last addition of sodium hydroxide and with completion of the reaction, the excess epichlorohydrin was removed by vacuum distillation with use of a vessel temperature up to about 150° C. and a pressure of about 50 mm. Hg. After completion of the distillation, the residue was cooled to about 90° C. and about 360 parts of benzene added. Continued cooling dropped the temperature of the mixture to about 40° C. with precipitation of sodium chloride from the solution. The sodium chloride was removed by filtration and carefully washed with about an additional 360 parts of benzene to remove the polyether therefrom. The two benzene solutions were combined and distilled to separate the benzene. When the vessel temperature reached about 125° C., vacuum was applied and distillation continued until the vessel temperature was about 170° C. at 25 mm. pressure. The resulting glycidyl polyether of bis-phenol had a Durran's Mercury Method softening point of 9° C., an average molecular weight of 370 by ebullioscopic measurement in ethylene dichloride, and an epoxide value of 0.50 epoxy equivalent per 100 grams. It had an epoxide equivalent weight of 200 and a 1,2-epoxy equivalency of 1.85. The product is designated hereinafter as Resin II.

Epoxy resin—High molecular weight

Epoxy resins of higher molecular weight were prepared by using smaller ratios of epichlorohydrin to bis-phenol. In a vessel fitted with an agitator, 228 parts (1 mol) of bis-phenol A and 86 parts (2.14 mols) sodium hydroxide as a 10% aqueous solution were introduced and heated to about 45° C., whereupon 145 parts (1.57 mols) of epichlorohydrin were added rapidly while agitating the mixture. The temperature of the mixture was then gradually increased and maintained at about 95° C. for 80 minutes. The mixture separates into a two-phase system and the aqueous layer was drawn off from the taffy-like product which formed. The latter was washed with hot water while molten until the wash water was neutral to litmus. The product was then drained and dried by heating to a final temperature of 130° C. The softening point of the resulting glycidyl polyether was 65° C. The measured molecular weight of the product was 630 and it had an epoxide value of 0.29 epoxy equivalent per 100 grams. The epoxide equivalent weight was 345 and the 1,2-epoxy equivalency was 1.8. It is identified hereinafter as Resin III.

Another glycidyl polyether was prepared in like manner to that of Resin III, except that, for each mol of bis-phenol A, there is employed 1.22 mols of epichlorohydrin and 1.37 mols of sodium hydroxide. The resulting polyether had a softening point of 98° C. by Durran's Mercury Method, a molecular weight of 1400 as measured ebullioscopically in ethylene dichloride, and an epoxide value of 0.11 epoxy equivalents per 100 grams. The epoxide equivalent weight was 910 and the 1,2-epoxy equivalency was 1.54. The product is identified hereinafter as Resin IV.

Thermohardenable blends of phenolic resins and epoxy resins

Having described above the preparation of the resin constituents of the thermohardenable blends of the present invention, the following experimental results illustrate the unique performance of the hydroxyalkylated tertiary amines as catalysts for said blends.

These blends were obtained by dissolving a phenolic resin in a molten epoxy resin at 150° C. and stirring until the mix was homogenous. Then the blend was cooled to 120° C. and the catalyst was thoroughly mixed therein, the blend was poured into a pan, allowed to cool, and was broken into lumps.

While it was possible to mold any of the blends, as listed in the following table, into useful articles under heat and pressure, for instance, at about 170° C. under 1000 pounds per square inch for 5 to 10 minutes, the blends showed different shelf lives at room temperature and different pot lives at elevated temperature.

The shelf life at room temperature was determined by keeping the resin blend in a jar at that temperature. At daily intervals a small lump was put on a heated hot plate and observed for flow. The resin lump would melt almost instantaneously and set up after some time. The end of the shelf life period was indicated by the fact that the resin did not melt.

The pot life at high temperature was checked in a similar way. The sample was kept at the specified temperature in a glass jar. Either the blend was fluid at that temperature, when the end of the pot life period was indicated by the fact that the resin resisted flow when the jar was turned over, or the blend was only soft at the specified temperature. Then it was necessary to cool a sample and check it on the hot plate as described in the preceding paragraph.

The tests are summarized in the following table:

| Test No. | Parts Epoxy Resin | Parts Resin I | Parts Catalyst | Pot Life at 130° C. | Shelf Life at 25° C. |
| --- | --- | --- | --- | --- | --- |
| 1 | 100 II | 60 | None | 6 hours | Over 4 months. |
| 2 | 100 II | None | 1.5 triethanol amine | 24 hours | Over 6 months. |
| 3 | 100 II | 60 | do | 10 min | 6 weeks. |
| 4 | 100 III | 30 | do | 5 min | 4 weeks. |
| 6 | 100 III | 30 | None | 2 hrs., 40 min | |
| 7 | 100 II | None | 3 Quadrol [1] | 24 hrs | Over 6 months. |
| 8 | 100 II | 60 | do.[1] | 14 min | 4 weeks. |
| 9 | 100 III | 30 | 2 Quadrol [1] | 24 min | 2 months. |
| 10 | 100 IV | 20 | do.[1] | 30 min | Over 3 months. |
| 12 | 100 II | None | 3 Ethomeen C/12 [2] | 24 hrs | Over 6 months. |
| 13 | 100 II | 60 | do.[2] | 7 min | 2 weeks. |
| 14 | 100 II | 60 | 3 Ethomeen C/25 [2] | 11 min | 4 weeks. |
| 15 | 100 II | 55 | 3 N,N-dimethylethanol amine | | 5 days. |
| 16 | 100 II | None | 3 N-meta toluyl diethanol amine | 24 hrs | Over 6 months. |
| 17 | 100 II | 60 | do | 1 hour, 40 min | Over 3 months. |
| 18 | 100 II | None | 2 tribenzylamine | 24 hours | Over 6 months. |
| 19 | 100 II | 60 | do | 1 hour, 5 min | Over 3 months. |
| 20 | 100 III | 30 | do | 55 min | Do. |

[1] Quadrol is the commercial name for N,N,N',N'-tetrakis(hydroxypropyl) ethylenediamine, manufactured by Wyandotte Chemicals Corp., Wyandotte, Michigan.
[2] Ethomeen is the commercial name for the compound

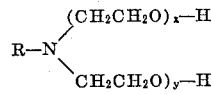

In Ethomeen S/12, R is a $C_{12}$ alkyl group obtained from coconut fatty acids.
In Ethomeen S/25, R is a $C_{18}$ alkyl group obtained from soybean fatty acids.

The table demonstrates the superior characteristics of triethanol amine N,N,N',N'-tetrakis(hydroxypropyl) ethylenediamine, and ethoxylated fatty acid amines represented by the formula

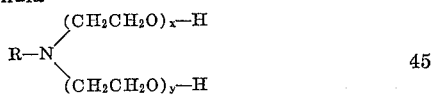

wherein R is a straight chain alkyl group having between 12 and 18 carbon atoms, and wherein the sum of $x$ and $y$ is between about 2 and about 15. The compounds yield blends of a long shelf life at room temperature, said blends being readily curable at elevated temperatures.

Other tertiary amines are not operative, because they confer too short a shelf life or cannot be cured within a reasonable time at elevated temperature. For instance, blends containing dimethyl ethanolamine have a shelf life of only five days. On the other hand, N-metatoluyl diethanolamine has an acceptable shelf life, but the cure at elevated temperature is too slow. Other amines not listed in the table, such as triethylamine, ethylene, diamine, diethylene triamine, ethanolamine, diethanolamine, and any other amines containing primary and secondary amine groups, were found to give an extremely short shelf life at room temperature.

I claim:
1. A stable thermohardenable resin composition comprising a blend of (A) an epoxide resin containing 1,2-epoxy groups, obtained by etherification of 4,4'-dihydroxydiphenyldimethylmethane, with epichlorohydrin in an alkaline medium; (B) a fusible novolac-type phenolic resin obtained by reacting formaldehyde, in an acidic medium, with monohydric phenols having at least one hydrogen formaldehyde-reactive atom attached to the benzene ring thereof, in a ratio of about 0.5 to 0.85 mol formaldehyde per 1.0 mol phenol, and, thereafter, removing at least substantial portions of the volatiles and the unreacted portion of the phenol by distillation, wherein the weight ratio of (A) to (B) is from about 1 to 5 to about 5 to 1; and (C) a small, catalytically effective amount of N,N,N',N'-tetrakis(hydroxypropyl) ethylenediamine.

2. A stable thermohardenable resin composition comprising a blend of (A) an epoxide resin containing 1,2-epoxy groups, obtained by etherification of 4,4'-dihydroxydiphenyldimethylmethane, with epichlorohydrin in an alkaline medium; (B) a fusible novolac-type phenolic resin obtained by reacting formaldehyde, in an acidic medium, with monohydric phenols having at least one hydrogen formaldehyde-reactive atom attached to the benzene ring thereof, in a ratio of about 0.5 to 0.85 mol formaldehyde per 1.0 mol phenol, and, thereafter, removing at least substantial portions of the volatiles and the unreacted portion of the phenol by distillation, wherein the weight ratio of (A) to (B) is from about 1 to 5 to about 5 to 1; and (C) a small, catalytically effective amount of ethoxylated fatty acid amines represented by the formula

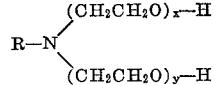

wherein R is a straight chain alkyl group having between 12 and 18 carbon atoms and wherein the sum of $x$ and $y$ is between about 2 and about 15.

3. As a method of producing stable thermohardenable resin compositions which comprises admixing with a blend of (A) an epoxide resin containing 1,2-epoxy groups obtained by etherification of 4,4'-dihydroxydiphenyldimethylmethane, with an epihalohydrin in an alkaline medium; (B) a fusible novolac-type phenolic resin obtained by reacting formaldehyde, in an acidic medium, with a phenol which is a member of the group comprising monohydric phenols having at least one hydrogen formaldehyde-reactive atom attached to the benzene ring thereof, in a ratio of about 0.5 to 0.85 mol formaldehyde per 1.0 mol phenol, and, thereafter, removing at least substantial portions of the volatiles and the unreacted portion of the phenol by distillation, wherein the weight ratio of (A) to (B) ranges from about 1 to 10 to about 10 to 1; a small, catalytically effective amount of N,N,N',N'-tetrakis(hydroxypropyl) ethylenediamine.

4. As a method of producing a stable thermohardenable resin composition, admixing to a blend of (A) an epoxide resin containing 1,2-epoxy groups obtained by etherification of 4,4'-dihydroxydiphenyldimethylmethane, with an epihalohydrin in an alkaline medium; (B) a fusible novolac-type phenolic resin obtained by reacting formaldehyde, in an acidic medium, with a phenol which is a member of the group comprising monohydric phenols having at least one hydrogen formaldehyde-reactive atom attached to the benzene ring thereof, in a ratio of about 0.5 to 0.85 mol formaldehyde per 1.0 mol phenol, and, thereafter, removing at least substantial portions of the volatiles and the unreacted portion of the phenol by distillation, wherein the weight ratio of (A) to (B) ranges from about 1 to 10 to about 10 to 1; a small, catalytically effective amount of ethoxylated fatty acid amines represented by the formula

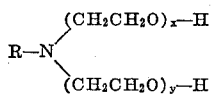

wherein R is a straight chain alkyl group having between 12 and 18 carbon atoms, and wherein the sum of $x$ and $y$ is between about 2 and about 15.

References Cited by the Examiner

UNITED STATES PATENTS 2,697,118  12/1954  Lundsted et al. _____ 260—584
3,200,172  8/1965   Renner _____ 260—831

OTHER REFERENCES

Lee et al.: Epoxy Resins, McGraw-Hill, N.Y., 1957 (pp. 73–79 and 88 relied on).

SAMUEL H. BLECH, *Primary Examiner.*

MURRAY TILLMAN, *Examiner.*

E. J. TROJNAR, *Assistant Examiner.*